US012586437B2

(12) United States Patent
Nelson et al.

(10) Patent No.: US 12,586,437 B2
(45) Date of Patent: Mar. 24, 2026

(54) CONTROLLING POWER CONSUMPTION IN GRAPHICS COMPONENTS OF GAMING DEVICES

(71) Applicant: IGT, Las Vegas, NV (US)

(72) Inventors: Dwayne Nelson, Las Vegas, NV (US); Patrick Danielson, Las Vegas, NV (US); William Salivar, Reno, NV (US)

(73) Assignee: IGT, Las Vegas, NV (US)

( * ) Notice: Subject to any disclaimer, the term of this patent is extended or adjusted under 35 U.S.C. 154(b) by 188 days.

(21) Appl. No.: 18/359,264

(22) Filed: Jul. 26, 2023

(65) Prior Publication Data

US 2025/0037532 A1     Jan. 30, 2025

(51) Int. Cl.
*G07F 17/32* (2006.01)
*G06F 1/3234* (2019.01)

(52) U.S. Cl.
CPC ........ *G07F 17/3211* (2013.01); *G06F 1/3265* (2013.01)

(58) Field of Classification Search
None
See application file for complete search history.

(56) References Cited

U.S. PATENT DOCUMENTS

| | | | | |
|---|---|---|---|---|
| 9,325,203 | B2 * | 4/2016 | Nguyen | ............... G07F 17/3227 |
| 10,554,476 | B2 * | 2/2020 | Garg | ........................ H04W 4/08 |
| 2023/0386290 | A1 * | 11/2023 | Davis | .................. G07F 17/3234 |

* cited by examiner

*Primary Examiner* — Ronald Laneau
(74) *Attorney, Agent, or Firm* — Sage Patent Group

(57) ABSTRACT

A gaming device includes a display device, a processor circuit, a first gaming device display interface coupled to the processor circuit, a second gaming device display interface coupled in series between the first gaming device display interface and the display device, and a memory coupled to the processor circuit. First graphical content is provided to the second gaming device display interface via the first gaming device display interface, and the first graphical content is provided to the display device via the second gaming device display interface. In response to a determination that a first trigger condition indicative of a power consumption reduction state for the gaming device has been satisfied, second graphical content is provided to the display device via the second gaming device display interface, and discontinue provision of the first graphical content via the first gaming device display interface is discontinued.

20 Claims, 10 Drawing Sheets

600

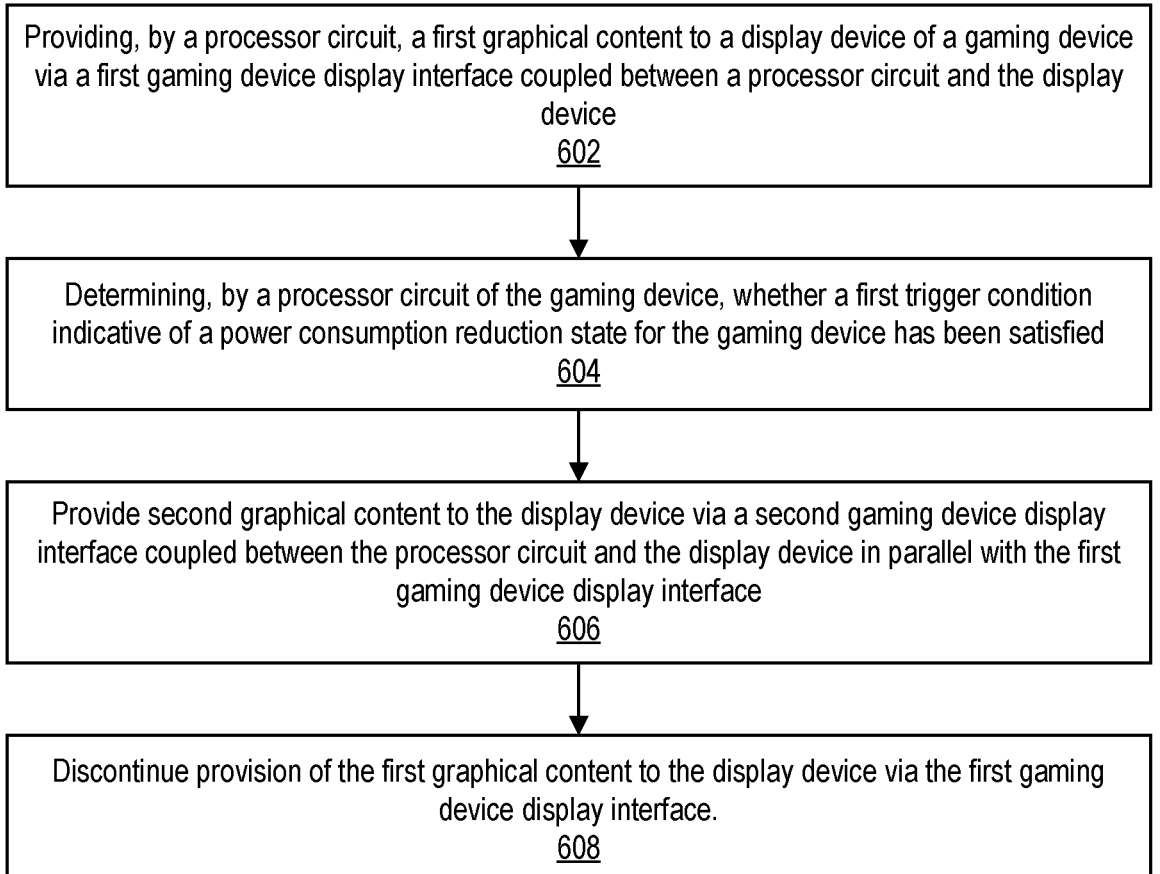

Providing, by a processor circuit, a first graphical content to a display device of a gaming device via a first gaming device display interface coupled between a processor circuit and the display device
602

Determining, by a processor circuit of the gaming device, whether a first trigger condition indicative of a power consumption reduction state for the gaming device has been satisfied
604

Provide second graphical content to the display device via a second gaming device display interface coupled between the processor circuit and the display device in parallel with the first gaming device display interface
606

Discontinue provision of the first graphical content to the display device via the first gaming device display interface.
608

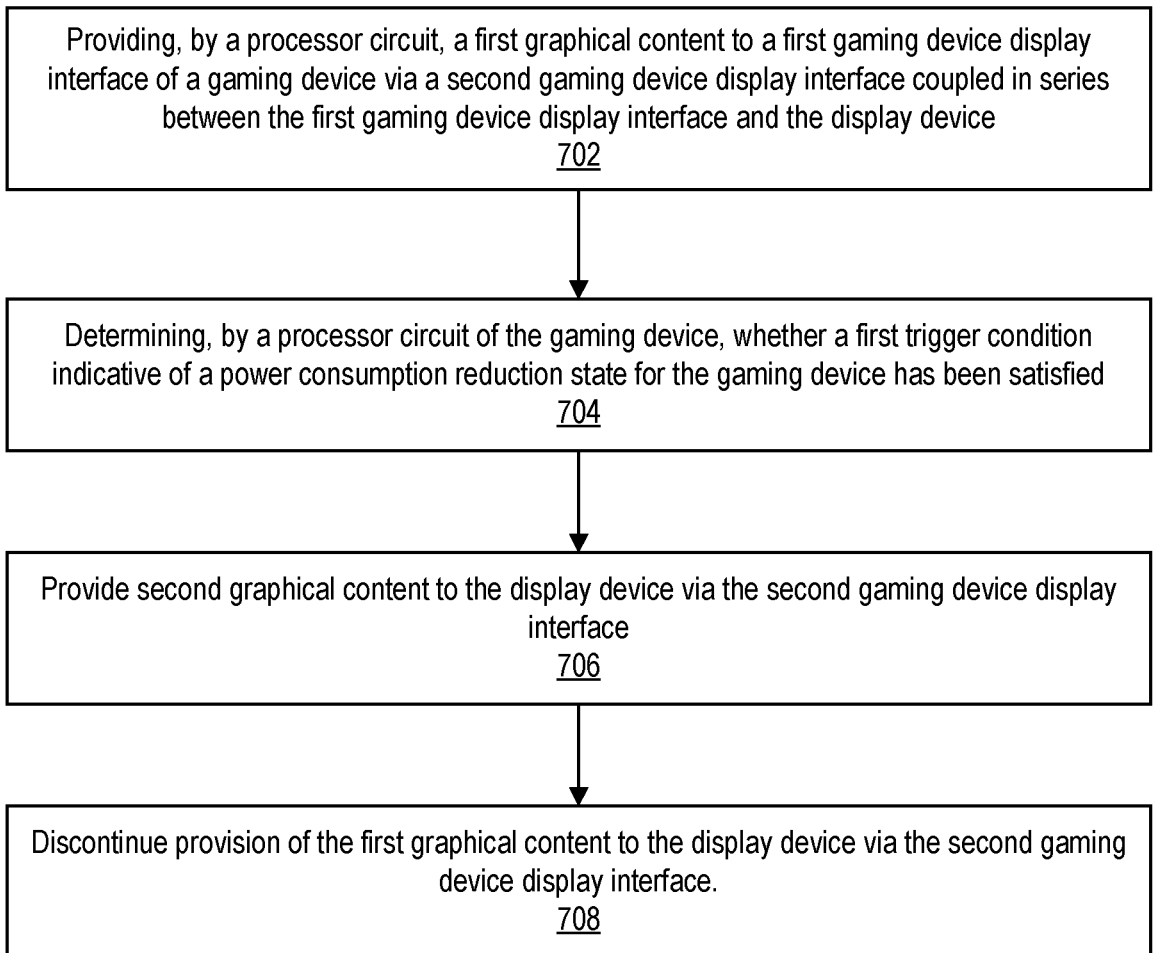

Providing, by a processor circuit, a first graphical content to a first gaming device display interface of a gaming device via a second gaming device display interface coupled in series between the first gaming device display interface and the display device
702

Determining, by a processor circuit of the gaming device, whether a first trigger condition indicative of a power consumption reduction state for the gaming device has been satisfied
704

Provide second graphical content to the display device via the second gaming device display interface
706

Discontinue provision of the first graphical content to the display device via the second gaming device display interface.
708

*FIG. 7*

CONTROLLING POWER CONSUMPTION IN GRAPHICS COMPONENTS OF GAMING DEVICES

BACKGROUND

Embodiments described herein relate to electronic gaming machines (EGMs), and in particular to controlling power consumption in EGMs, and related systems, devices, and methods. EGMs in a gaming environment, such as a casino environment, consume significant amounts of energy when in use, compounded by the number of EGMs in use at any given time, which can number in the hundreds or thousands in larger properties. As the financial and environmental costs of energy use increases, there is a need to more efficiently control power consumption for these EGMs.

SUMMARY

According to some embodiments, a gaming device includes a display device, a processor circuit, a first gaming device display interface coupled to the processor circuit, a second gaming device display interface coupled in series between the first gaming device display interface and the display device, and a memory coupled to the processor circuit. The memory includes machine-readable instructions that, when executed by the processor circuit, cause the processor circuit to provide first graphical content to the second gaming device display interface via the first gaming device display interface, provide the first graphical content to the display device via the second gaming device display interface, and determine whether a first trigger condition indicative of a power consumption reduction state for the gaming device has been satisfied. In response to the determination that the first trigger condition has been satisfied, the instructions further cause the processor circuit to provide second graphical content to the display device via the second gaming device display interface, and discontinue provision of the first graphical content via the first gaming device display interface.

According to some embodiments, a system includes a processor circuit and a memory coupled to the processor circuit. The memory includes machine-readable instructions that, when executed by the processor circuit, cause the processor circuit to provide first graphical content via a first gaming device interface of the gaming device to a second gaming device display interface of the gaming device, provide the first graphical content to a display device of the gaming device via the second gaming device display interface, and determine whether a first trigger condition indicative of a power consumption reduction state for the gaming device has been satisfied. In response to the determination that the first trigger condition has been satisfied, the instructions further cause the processor circuit to provide second graphical content to the display device via the second gaming device display interface, and discontinue provision of the first graphical content via the first gaming device display interface.

According to some embodiments, a method includes providing, by a processor circuit, a first graphical content to a first gaming device display interface of a gaming device via a second gaming device display interface coupled in series between the first gaming device display interface and the display device. The method further includes determining, by a processor circuit of the gaming device, whether a first trigger condition indicative of a power consumption reduction state for the gaming device has been satisfied. In response to determining that the first trigger condition has been satisfied, the method further includes providing second graphical content to the display device via the second gaming device display interface; and discontinuing provision of the first graphical content to the display device via the second gaming device display interface.

BRIEF DESCRIPTION OF THE DRAWINGS

FIG. 6 is a flowchart illustrating operations of systems/methods according to some embodiments;

FIG. 7 is a flowchart illustrating operations of systems/methods according to some embodiments.

DETAILED DESCRIPTION

Embodiments described herein relate to electronic gaming machines (EGMs), and in particular to controlling power consumption in EGMs, and related systems, devices, and methods. Many modern gaming devices, such as Electronic Gaming Machines (EGMs), Video Lottery Terminals (VLTs), sports wagers devices, kiosks, etc. may include components such as dedicated video cards that may consume significant amounts of electricity, which may increase costs for the gaming device operator and which may raise environmental concerns. These components may also produce significant amounts of unwanted heat during use, which may lead to increased cooling costs and reduction in component life through prolonged heat exposure. Accordingly, there is need to reduce electricity consumption and heat generation. Embodiments herein address these problems in a number of ways.

For example, in many gaming devices, a dedicated Graphics Processing Unit (GPU) may be connected to a motherboard of a gaming device, e.g., via a PCI-e or MxM connector for example, which can consume hundreds of watts of electricity during normal operation. This electricity usage may also generate significant amounts of heat, which may be cooled by additional fans or other cooling systems, which in turn may consume even more electricity. Dissipation of this additional heat into the environment, e.g., a casino floor environment, may raise the environmental temperature, thereby affecting cooling requirements, e.g., air conditioning, for the environment as well.

Some gaming devices may also include Central Processing Units (CPUs) that include integrated GPUs (iGPUs), which may use less electricity and produce less heat during use than the dedicated GPU, but that may also have reduced performance. Some gaming devices may also have the capability to removably install supplemental video processor devices that may consume less power during use. Some gaming devices may also have a Slot Machine Interface Board (SMIB), which may have its own independent video capabilities.

Figure 1:
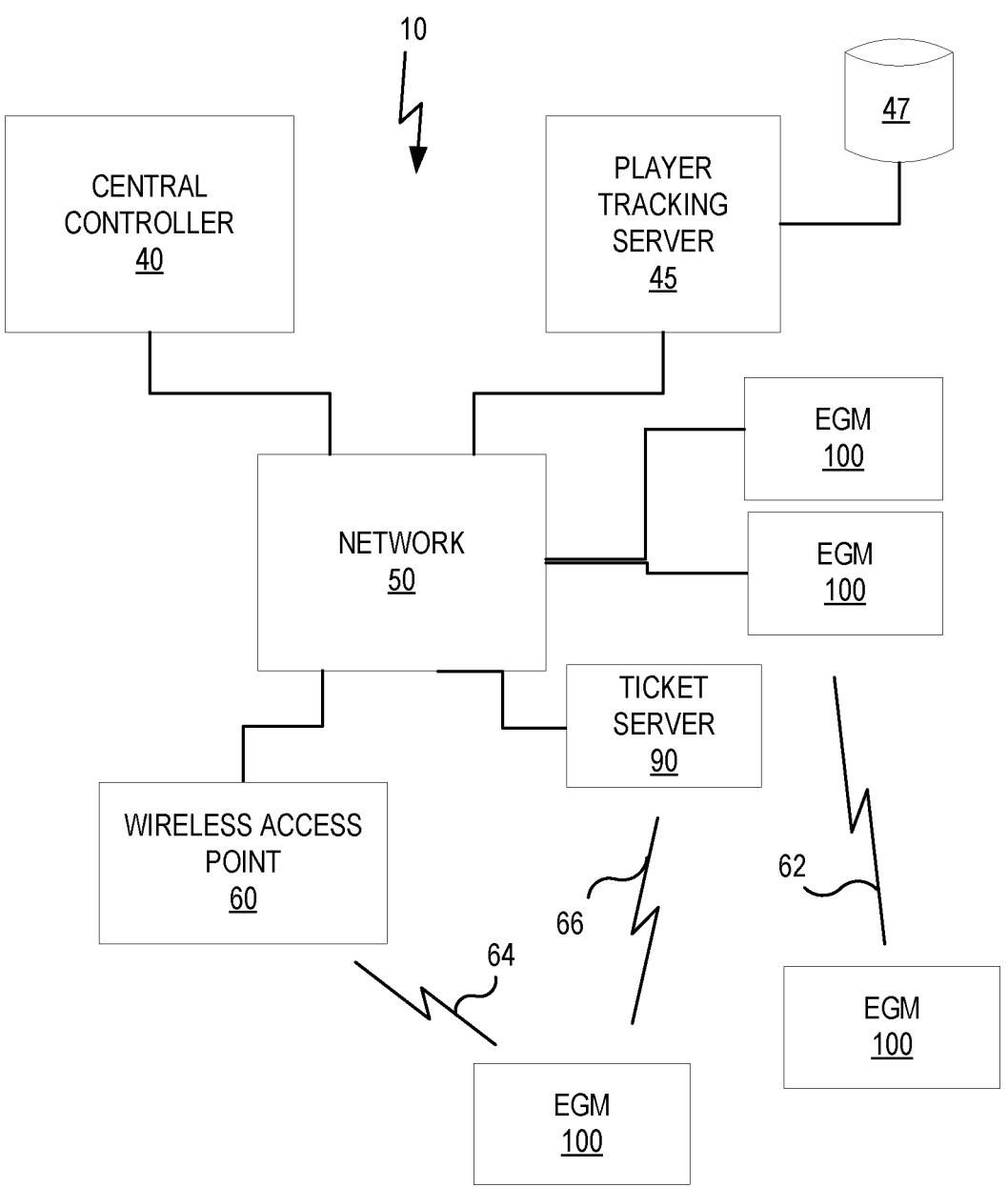
FIG. 1 is a schematic block diagram illustrating a network configuration for a plurality of gaming devices according to some embodiments.

Before discussing these and other embodiments in detail, reference is made to FIG. 1, which illustrates a gaming system 10 including a plurality of gaming devices 100. As discussed above, the gaming devices 100 may be one type of a variety of different types of gaming devices, such as electronic gaming machines (EGMs), mobile devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processor circuit and at least one memory or storage device. Each gaming device 100 may include a processor circuit that transmits and receives events, messages, commands or any other suitable data or signal between the gaming device 100 and the central controller 40. The gaming device processor circuit is operable to execute such communicated events, messages or commands in conjunction with the operation of the gaming device 100. Moreover, the processor circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processor circuits. Moreover, in some embodiments, one or more of the functions of one or more gaming device processor circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processor circuit that transmits and receives events, messages, commands or any other suitable data or signal between the ticket server 90 and the central controller 40. The ticket server 90 processor circuit may be operable to execute such communicated events, messages or commands in conjunction with the operation of the ticket server 90.

Moreover, in some embodiments, one or more of the functions of one or more ticket server 90 processor circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, an NFC link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
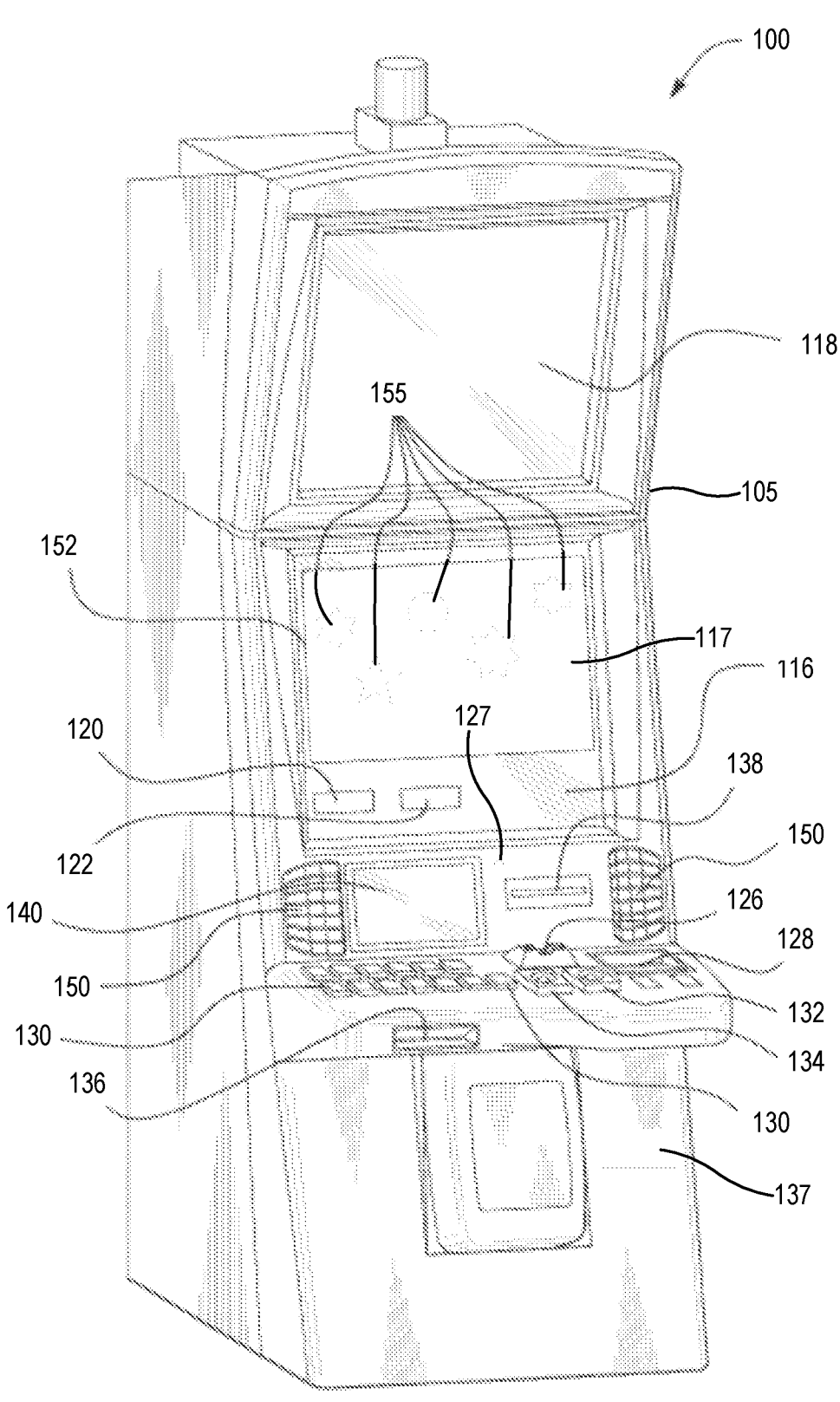
FIGS. 2A to 2E illustrate gaming devices according to various embodiments.
Figure 2B:
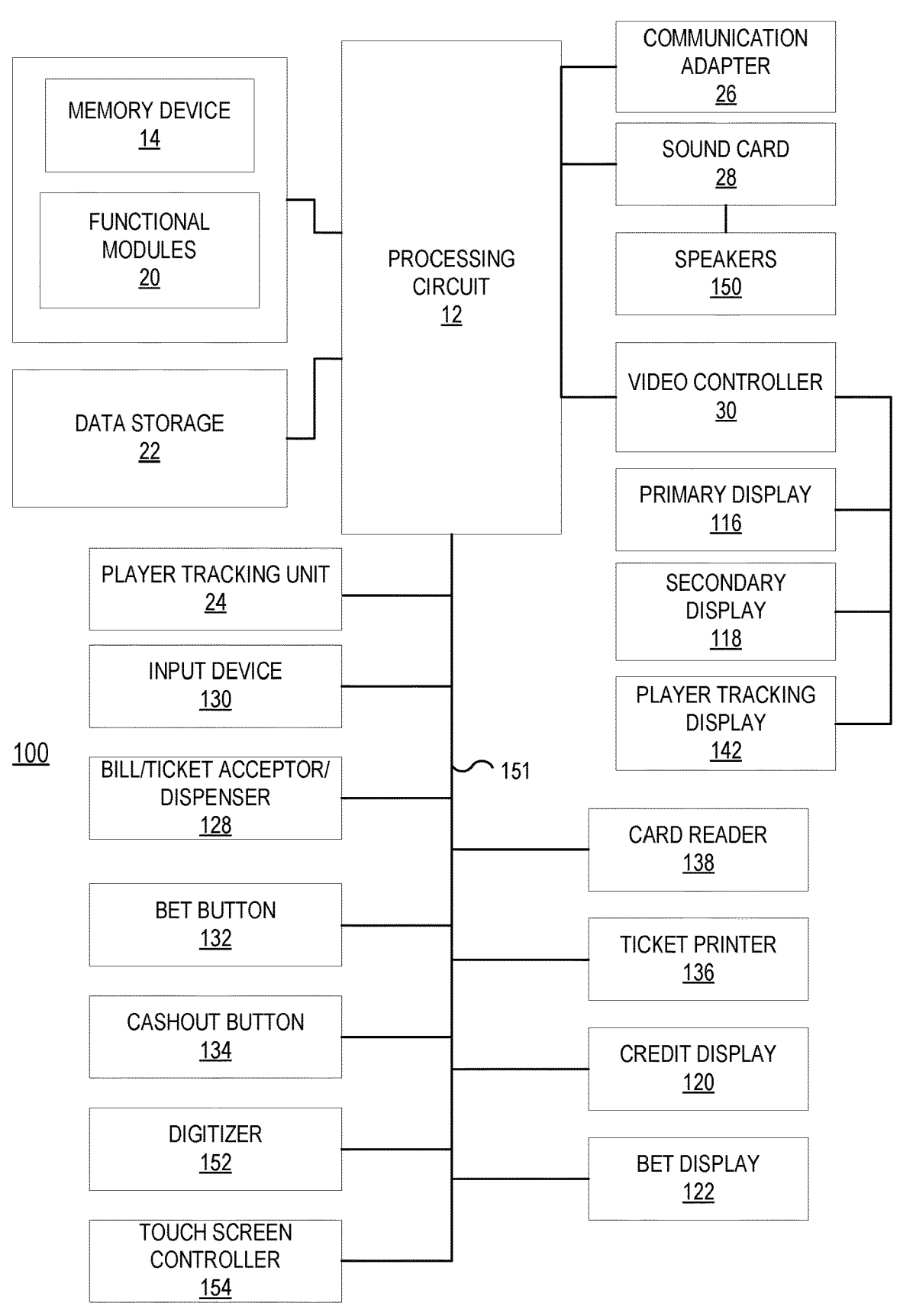
Figure 2C:
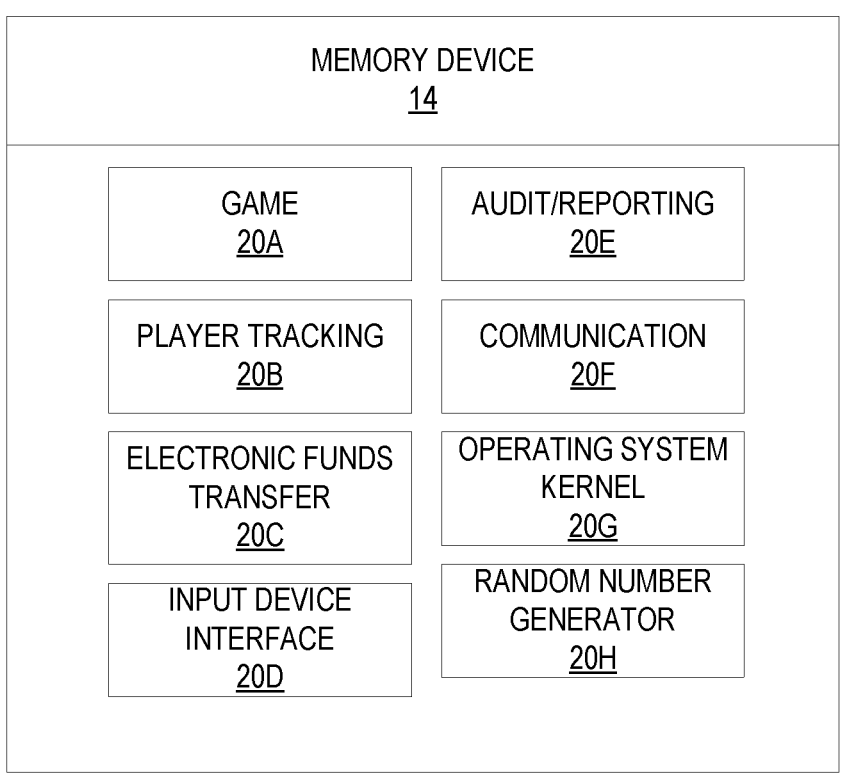

Embodiments herein may include different types of gaming devices. Various embodiments are illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments of the inventive concepts are not limited to the particular gaming device structures described herein.

Gaming devices 100 typically include a number of standard features, many of which are illustrated in FIGS. 2A and 2B. For example, referring to FIG. 2A, a gaming device 100 may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously-placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processor circuit 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processor circuit 12. In some embodiments however, the credit display 120 and/or the bet display 122 may be driven by the video controller 30. The gaming device 100 may also include a player tracking unit 24 for managing communications and functionality between the processor circuit 12 and certain peripherals and components. Player tracking units 24 may be standardized across machine types to operate interchangeably across a manufacturer's lineup.

Referring again to FIG. 2A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket printer 136, a bill/ticket acceptor/dispenser 128, that allows the player to deposit and/or receive tickets and/or currency into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processor circuit 12 that controls operations of the gaming device 100. Although illustrated as a single processor circuit, multiple special purpose and/or general purpose processors and/or processor cores may be provided in the gaming device 100. For example, the gaming device 100 may include one or more of a video processor, a signal processor, a sound processor and/or a communication controller that performs one or more control functions within the gaming device 100. The processor circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processor circuit 12. It will be appreciated that the components may be connected to the processor circuit 12 through a system bus 151, a communication bus and controller, such as a USB controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processor circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the gaming device 100 to communicate, for example, with a mobile communication device operated by a player.

The gaming device 100 may include one or more internal or external communication ports that enable the processor circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor circuit through a universal serial bus (USB) hub (not shown) connected to the processor circuit 12.

In some embodiments, the gaming device 100 may include a sensor, such as a camera 127, in communication with the processor circuit 12 (and possibly controlled by the processor circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processor circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

Many embodiments described herein employ gaming devices 100 that are land-based EGMs, such as banks of slot machines in a casino environment, but in some embodiments, a gaming device 100 may additionally or alternatively include a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a handheld device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
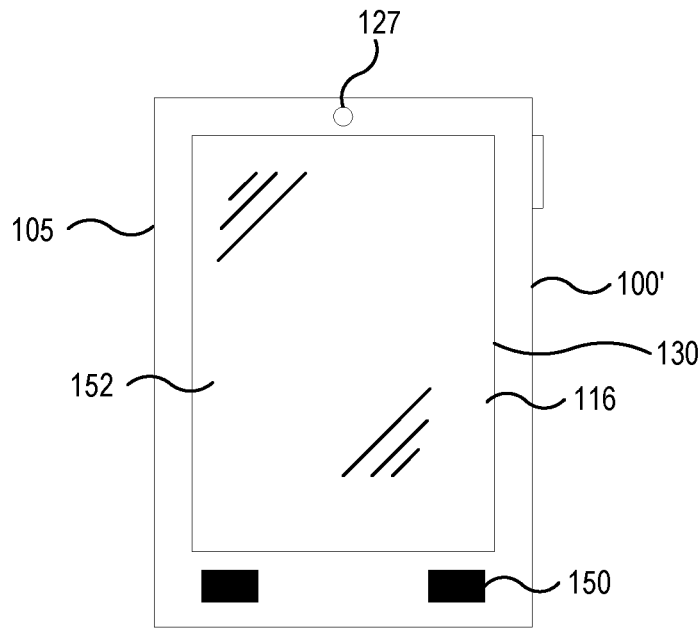

For example, referring to FIG. 2D, a gaming device 100' may be implemented as a handheld device including a compact housing 105 on which is mounted a touchscreen display device 116 including a digitizer 152. As described in greater detail with respect to FIG. 3 below, one or more input devices 130 may be included for providing functionality of for embodiments described herein. A camera 127 may be provided in a front face of the housing 105. The housing 105 may include one or more speakers 150. In the gaming device 100', various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100' may omit certain features, such as a bill acceptor, a ticket generator, a coin acceptor or dispenser, a card reader, secondary displays, a bet display, a credit display, etc. Credits can be deposited in or transferred from the gaming device 100' electronically.

Figure 2E:
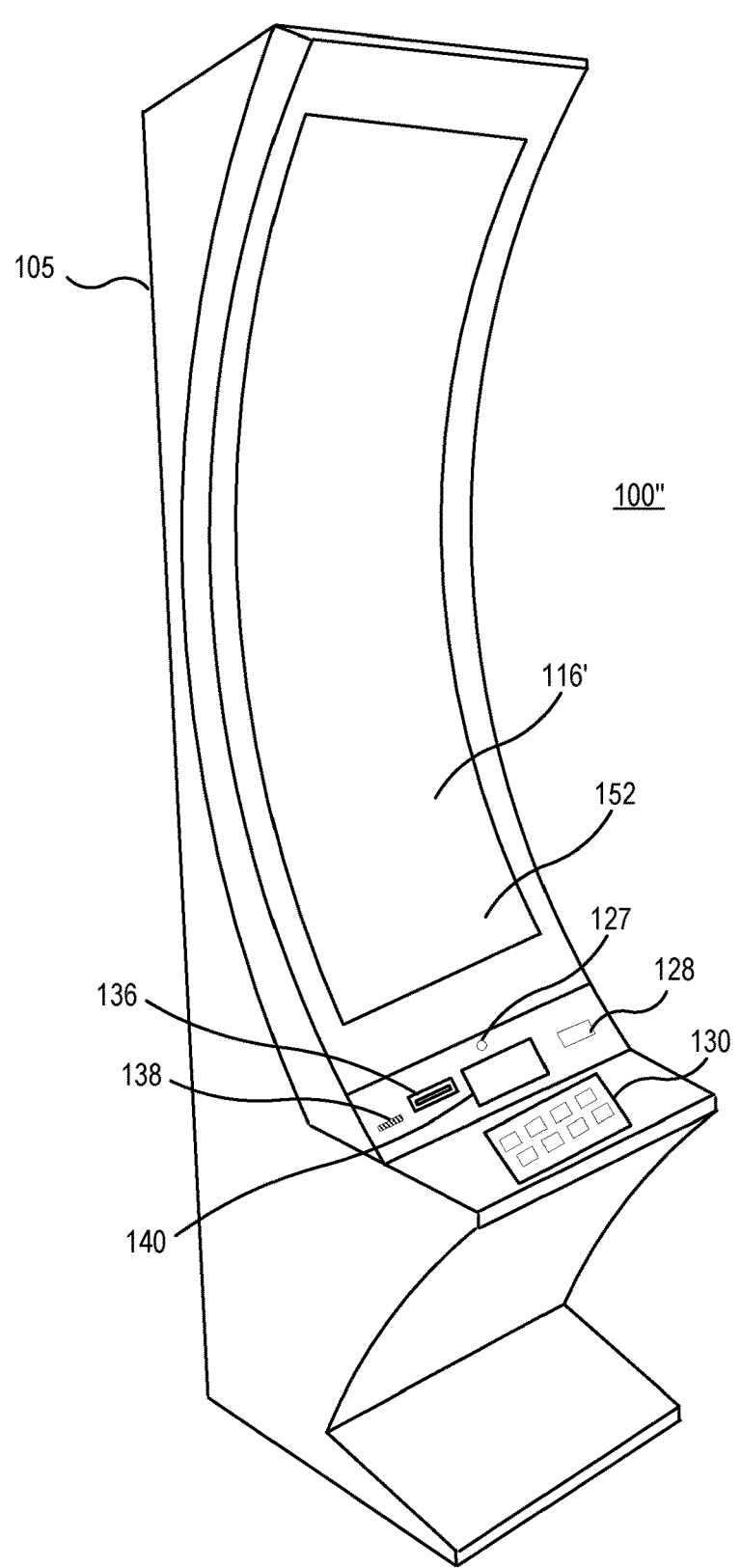

FIG. 2E illustrates a standalone gaming device 100", i.e., an EGM in this example, having a different form factor from the gaming device 100 illustrated in FIG. 2A. In particular, the gaming device 100" is characterized by having a large, high aspect ratio, curved primary display device 116' provided in the housing 105, with no secondary display device. The primary display device 116' may include a digitizer 152 to allow touchscreen interaction with the primary display device 116'. The gaming device 100" may further include a player tracking display 142, an input device 130, a bill/ticket acceptor 128, a card reader 138, and a bill/ticket dispenser 136. The gaming device 100" may further include one or more cameras 127 to enable facial recognition and/or motion tracking.

Although illustrated as certain gaming devices, such as electronic gaming machines (EGMs) and mobile devices, similar functions and/or operations as described herein may include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 3:
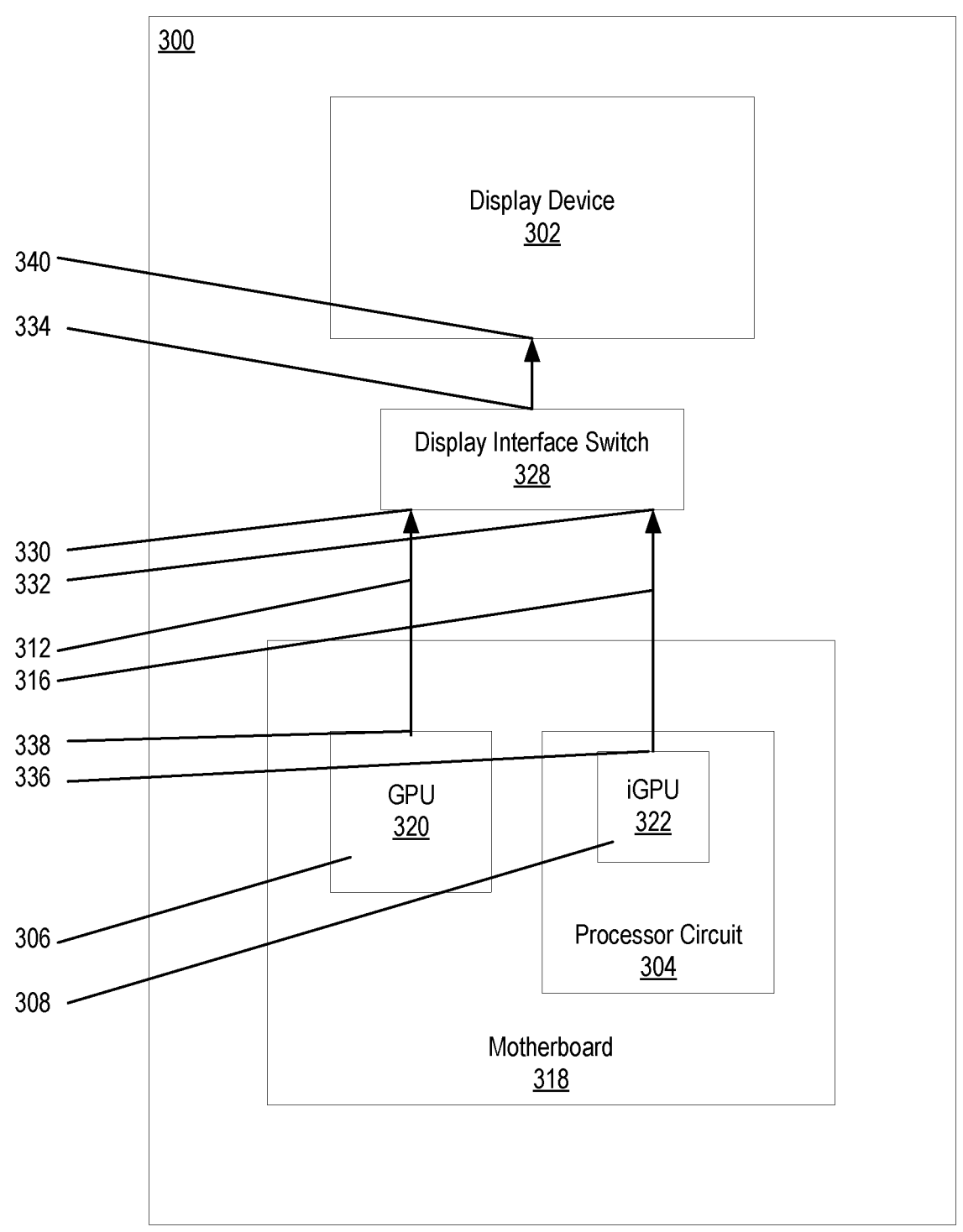
FIG. 3 illustrates a gaming device that includes a display device and a plurality of gaming device display interfaces including an integrated Graphics Processing Unit (iGPU), according to some embodiments.

In this regard, FIG. 3 illustrates a gaming device 300 that includes a display device 302, a processor circuit, 304, a first gaming device display interface 306 coupled between the processor circuit 304 and the display device 302, and a second gaming device display interface 308 coupled between the processor circuit 304 and the display device 302 in parallel with the first gaming device display interface 306. In this example, the processor circuit 304 is coupled to a motherboard 318. In this example, the first gaming device display interface 306 includes a separate Graphical Processor Unit (GPU) 320 coupled to the motherboard 318, and the second gaming device display interface 308 includes an integrated GPU 322 integrated in the processor circuit 304. In this example, first graphical content 312 is provided to the display device 302 via the first gaming device display interface 306.

The processor circuit 304 determines whether a first trigger condition indicative of a power consumption reduction state for the gaming device 300 has been satisfied. In some examples, the first trigger condition may include an activity level at the gaming device falling below a predetermined threshold. In another example, the first trigger condition may include discontinuance of a particular wagering game at the gaming device 300 and initiation of a different wagering game at the gaming device 300. In some examples, the first trigger condition may be based on a player status of a player of a wagering game at the gaming device. Other examples of a trigger condition may include a period of inactivity, absence of a player, a time of day, a command from a host system, a predetermined delay, a lack of credits or money on the EGM, an idle condition (e.g., no active gaming session), a player not being logged in, a command issued to a GPU driver of the GPU 320, a command issued to custom hardware that may remove power to the GPU 320, or halting bus traffic to the GPU 320, etc.

In response to the determination that the first trigger condition has been satisfied, second graphical content 316 may be provided to the display device via the second gaming device display interface 308. To conserve power, provision of the first graphical content 312 to the display device 302 via the first gaming device display interface 306 is discontinued. Provision of the second graphical content 316 may be preceded by activating the second gaming device display interface 308, wherein providing the second graphical content 316 to the display device 302 via the second gaming device display interface 308 is in response to the determination that the second gaming device display interface 308 is active.

At a later time, the processor circuit 304 determines whether a second trigger condition indicative of a power consumption resumption state for the gaming device 300 has been satisfied. In response to the determination that the second trigger condition has been satisfied, provision of the first graphical content 312 to the display device 302 via the first gaming device display interface 306 may be resumed. Other examples of a second trigger condition may include player activity such as button or touchscreen input, presence of a player (or a particular player), time of day, a command from a host system, credits or money added to the EGM, insertion of a ticket or money by a player, initiation of a money transfer by the host (e.g., SAS AFT or EFT), a game start, a player logging in, input from a mobile device, operator input (e.g., a key turn or code entry to enter an operator mode), device activity, a USB device message, activation of a phone charger function, network activity, pairing of a mobile device, and/or proximity of a mobile device, etc.

In response to the determination that the second trigger condition has been satisfied, provision of the second graphical content 316 to the display device 302 via the second gaming device display interface 308 may also be discontinued.

In this example, a display interface switch 328 may be provided that includes a first input 330 coupled to an output 336 of the first gaming device display interface 306, a second input 332 coupled to an output 338 of the second gaming device display interface 308, and an output 334 coupled to an input 340 of the display device 302. In this example, providing second graphical content 316 to the display device 302 via the second gaming device display interface includes enabling the second input 332 of the display interface switch 328 and disabling the first input 330 of the display interface switch 328. Providing the second graphical content 316 to the second input 332 of the display interface switch 328 may cause the display interface switch 328 to automatically provide the second graphical content 316 to the output 334 of the display interface switch 328. Alternatively, or in addition, discontinuing the provision of the first graphical content 312 to the first input 330 of the display interface switch 328 may cause the display interface switch 328 to automatically provide the second graphical content 316 to the output 334 of the display interface switch 328.

In some embodiments the display interface switch 328 may be integrated into the display device 302, such as a monitor with two or more video inputs. In some examples, the display interface switch 328 may have a priority mechanism such that one input has priority over the other and the display interface switch 328 will always select that input when there is a signal. For example, the second input 332 of display interface switch 328 may be given priority, such that the second graphical content 316 will always take priority over the first graphical content 312 provided at the first input 330. In this manner, activation of the integrated GPU 322 may automatically cause the display interface switch 328 to switch to the second graphical content 316, thereby allowing the GPU 320 to be powered down or placed in a low power mode. It should also be understood that the gaming device 300 or system may include multiple displays with different display interface switches that may control the video inputs for the different displays together, or independently, as desired. In some examples, the gaming device 300 may take additional actions as well, such as only displaying to a subset of display devices, using a lower frame rate, changing a brightness of the display device, etc. For example, a low power mode may continue to display attract content on a topper and upper display, while placing a lower primary display in a low power state. In some examples, the display interface switch 328 and/or the first and second display interfaces 206, 208 may be controlled by the gaming device 300, such as by an HDMI-CEC command, for example.

In some examples, these and other energy savings modes may be fully or partially controlled by a casino or lottery host system by communication with the gaming device 300 over a network, such as via an industry-standard G2S protocol. In some examples, the host system may communicate with the gaming device 300 indirectly, e.g., by communicating with a Slot Machine Interface Board (SMIB). In some examples, the host system may provide a configuration for the gaming device 300 of when to enter/exit power savings mode, such as when a lottery closes and opens for the day. In some examples, control may be in response to presence detection by a surveillance system, e.g., via motion sensing, seat/floor detection methods, pressure switches, etc.

In some embodiments, the gaming device may provide a transition between first and second graphical content provided by different components of the gaming device. For example, in response to a first trigger condition, e.g., a lack of activity at the gaming device, but before the second graphical content is displayed, third graphical content may be provided by the first gaming device display interface or other component of the gaming device as a transition between providing the first graphical content and the second graphical content.

For example, in response to the determination that the first trigger condition has been satisfied, the second gaming device display interface may be activated, with the third graphical content being provided while the second gaming device display interface is activating. Likewise, in response to a determination that the second gaming device display interface is active, the second graphical content may be provided to the display device via the second gaming device display interface, and provision of the first graphical content and/or the third graphical content (i.e., transition content) may be discontinued.

In this manner, the transition between power states can be made more seamless. In some examples, the transition content may employ a mix of prerecorded, autogenerated, or dedicated content. For example, upon a player inserting a bill into the acceptor, a transition scene starts and allows the gaming device to return to an active state with the primary game ready to be played. In some examples, an attract mode or other transition content may be available in both high and low power states. For example, a game may enter an attract mode state and initiate a transition to a low power state. The lower power device may be activated, and the transition to new graphical content may be switched at the moment of synchronization.

In some examples, the transition content may be a replay of pre-recorded video from the gaming device or another gaming device. In some examples, the transition content may be streamed from another active gaming device with a similar game theme, pre-recorded sessions shared and distributed via the system based on installed themes, and/or host controlled streaming based on the installed themes, etc., as desired.

Figure 4:
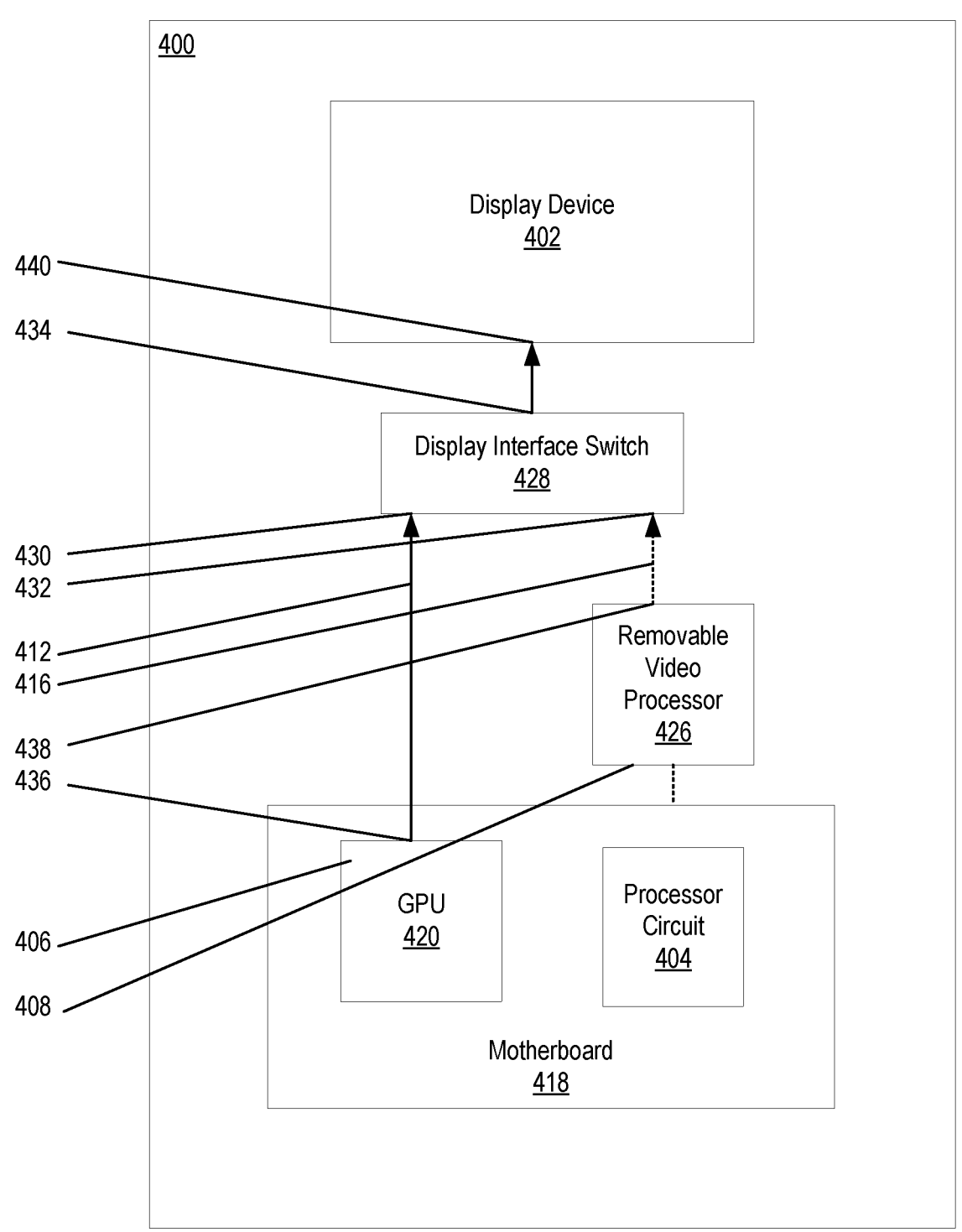
FIG. 4 illustrates a gaming device that includes a display device and a plurality of gaming device display interfaces including a removable video processor device, according to some embodiments.

According to another embodiment, FIG. 4 illustrates a gaming device 400 that includes a display device 402, a processor circuit, 404, a GPU 420 including first gaming device display interface 406 coupled between the processor circuit 404 and the display device 402, and a removable video processor device 426 including a second gaming device display interface 408 coupled between the processor circuit 404 and the display device 402 in parallel with the first gaming device display interface 406. In this example, the processor circuit 404 and the GPU 420 are coupled to a motherboard 418, and the removable video processor device 426 may be coupled to the motherboard 418 directly and/or to an I/O interface, e.g., PCI-e, MXM, USB etc., that enables communication between the removable video processor device 426 and the other components of the gaming device 400.

As with the example of FIG. 3 above, first graphical content 412 may be provided to the display device 402 via the first gaming device display interface 406, and the processor circuit 404 may determine whether a first trigger condition indicative of a power consumption reduction state for the gaming device 400 has been satisfied. In response to the determination that the first trigger condition has been satisfied, second graphical content 416 may be provided to the display device via the second gaming device display interface 408, and provision of the first graphical content 412 to the display device 402 via the first gaming device display interface 406 may be discontinued. At a later time, the processor circuit 404 may further determine whether a second trigger condition indicative of a power consumption resumption state for the gaming device 400 has been satisfied and, in response to the determination that the second trigger condition has been satisfied, provision of the first graphical content 412 to the display device 402 via the first gaming device display interface 406 may be resumed and/or provision of the second graphical content 416 to the display device 402 via the second gaming device display interface 408 may be discontinued.

In this example, a display interface switch 428 may include a first input 430 coupled to an output 436 of the first gaming device display interface 406, a second input 432 coupled to an output 438 of the second gaming device display interface 408, and an output 434 coupled to an input 440 of the display device 402. In this example, providing second graphical content 416 to the display device 402 via the second gaming device display interface includes enabling the second input 432 of the display interface switch 428 and disabling the first input 430 of the display interface switch 428. Providing the second graphical content 316 to the second input 432 of the display interface switch 428 may cause the display interface switch 428 to automatically provide the second graphical content 416 to the output 434 of the display interface switch 428. Alternatively, or in addition, discontinuing the provision of the first graphical content 412 to the first input 430 of the display interface switch 428 may cause the display interface switch 428 to automatically provide the second graphical content 416 to the output 434 of the display interface switch 428.

In some examples, the removable video processor device 426 may include a memory storing the second video graphical content 416, such as videos showing a jackpot, advertisements, sample game play, attract content, etc. In some examples, the removable video processor device 426 may also have independent sound capability, which may be combined with video content (e.g., an HDMI video signal).

Figure 5:
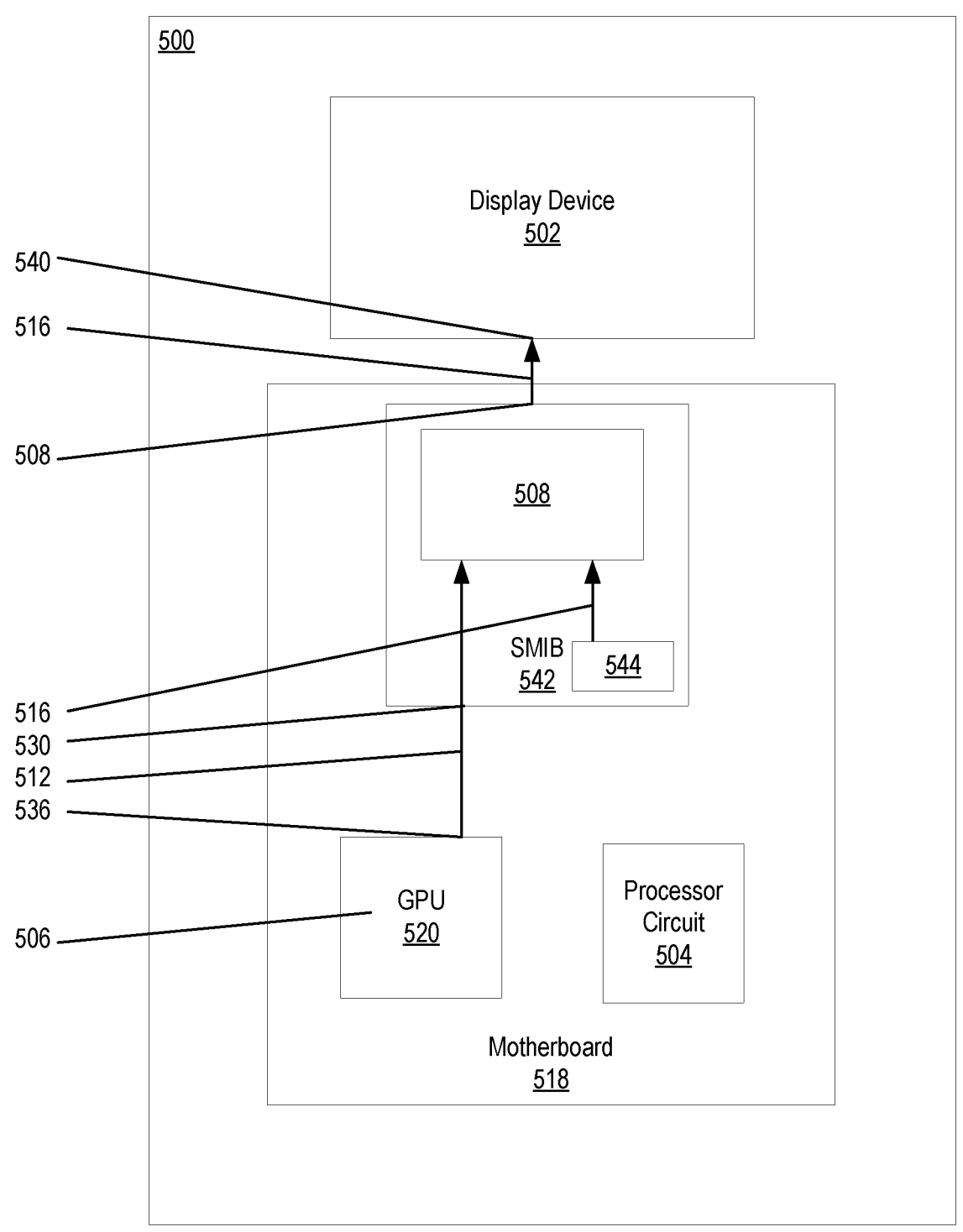
FIG. 5 illustrates a gaming device that includes a display device and a plurality of gaming device display interfaces including a Slot Machine Interface Board (SMIB), according to some embodiments.

According to another embodiment, FIG. 5 illustrates a gaming device 500 that includes a display device 502, a processor circuit, 504, a GPU 520 including first gaming device display interface 506, and a Slot Machine Interface Board (SMIB) 542 including a second gaming device display interface 508 coupled in series between the first gaming device display interface 506 and the display device 502. In this example, the processor circuit 504 and the GPU 520 are coupled to a motherboard 518, and the SMIB 542 may be coupled to the motherboard 518 directly and/or to an I/O interface, e.g., PCI-e, M×M, USB, etc., that enables communication between the SMIB 542 and the other components of the gaming device 500.

In this example, first graphical content 512 may be provided to the SMIB 542 via the first gaming device display interface 506, and the SMIB 542 may pass the first graphical content 512 to the display device 502 via the second gaming device display interface 508. The processor circuit 504 may determine whether a first trigger condition indicative of a power consumption reduction state for the gaming device 500 has been satisfied and. In response to the determination that the first trigger condition has been satisfied, second graphical content 516 may be provided to the display device via the second gaming device display interface 508, and provision of the first graphical content 512 to the display device 502 via the first gaming device display interface 506 and/or the second gaming device display interface 508 may be discontinued. At a later time, the processor circuit 504 may further determine whether a second trigger condition indicative of a power consumption resumption state for the gaming device 500 has been satisfied and, in response to the determination that the second trigger condition has been satisfied, provision of the first graphical content 512 to the display device 502 via the first gaming device display interface 506 and second gaming device display interface 508 may be resumed and/or provision of the second graphical content 516 to the display device 502 via the second gaming device display interface 508 may be discontinued.

In this example, the SMIB 542 may include an input 530 coupled to an output 536 of the first gaming device display interface 506, and an output 534 coupled to an input 540 of the display device 502. In this example, providing second graphical content 516 to the display device 502 via the second gaming device display interface 508 may include disabling the input 530 of the SMIB 542 and/or disabling the output 536 of the first gaming device display interface 506. Alternatively, or in addition, discontinuing the provision of the first graphical content 512 to the input 530 of the SMIB 542 may cause the SMIB 542 to automatically provide the second graphical content 516 to the display device 502.

In some embodiments, a SMIB 542 is configured to overlay part of the display or completely replace the video from the gaming device 500. The overlay may be achieved by combining the video input from the gaming device 500 with video content provided by the SMIB 542, e.g., from an overlay board 544. In some examples, an overlay board may 544 be a separate component from the SMIB 542 or may be integrated in the SMIB 542, as desired. In some examples, the first trigger condition may cause the SMIB 542 to display the second graphical content 516 as an overlay, and may cause the GPU 520 to stop providing the first graphical content 512. Likewise, the second trigger condition may cause the SMIB 542 to stop displaying the overlay and may cause the GPU 520 to resume providing the first graphical content 512.

In some examples, the second graphical content 516 may be provided by a host system, which may be provided to the SMIB 542 via a network connection. This may allow the host system to customize the content used during the energy savings mode, and may be further customized on a gaming device by gaming device basis, as desired. For example, the host system might instruct all gaming devices that are in the energy savings mode to advertise a specific event or product. In some examples, commands may be provided via SAS or other communication protocols, and may include information regarding entering/exiting a video overlay/power saving mode, starting/ending a game or game session, wins, wagers, and money events, player activity, cabinet activity (e.g., opening or unlocking a service door or panel), etc.

In some examples, the SMIB 542 may record the first graphical content 512 from the gaming device 500. For example, the SMIB 542 may detect game starts and ends along with wins, and may build a database of videos from the gaming device 500 based on different criteria, e.g., videos of large wins such as wins over $1,000, key wins such as the most significant event in the paytable (e.g., royal flush), etc. Later, when the gaming device 500 places the SMIB 542 into energy savings mode, the SMIB 542 may play videos it has created as the second graphical content 516. In some examples, the SMIB 542 may refresh its database over time. For example, the gaming device 500 may notify the SMIB 542 that game content on the gaming device 500 has changed, and may instruct the SMIB 542 to generate new videos based on the new game content. For example, the gaming device 500 might notify the SMIB 542 that one paytable was enabled and another paytable was disabled over SAS. The SMIB 542 may then disable or discard its videos of the disabled paytable and start recording or learning videos of the newly enabled paytable.

In some examples, the SMIB 542 may communicate directly with the host system. For example, the host system may bypass the gaming device CPU to instruct the SMIB 542 to enter/exit energy savings instead of the gaming device 500 directly. The SMIB 542 may also then inform the gaming device 500 to disable its GPU 520.

In some examples, the SMIB 542 and display device(s) 502 may be independently powered. For example, the SMIB 542 may instruct a gaming device 500 to enter and exit sleep/low-power modes which powers down the components that the chipset has control over. The SMIB 542 could learn to power down over the network (e.g., via host system communications) or it could decide based on the information it learns from the gaming device 500 (e.g., via SAS). The control of this activity could be some local configuration on the SMIB 542 or may be centrally controlled by a host system, as desired.

In some examples, the gaming device may include adjustable options for increasing or decreasing demand for power, such as graphical effects that have a high load demand on the GPU, such as shimmer for example.

In some embodiments, the gaming device may track an amount of time in energy savings mode and may track the associated cost and energy savings. For example, the gaming device may track the energy costs of the devices in normal and energy savings mode, the operator may enter the values, and/or the values may be provided by the host system. In some embodiments, the host system or gaming device may obtain values from a network device, e.g., via the internet. The host system or gaming device may compute energy or cost savings based on tracking gaming devices in energy savings mode. The information can be aggregated over a period of time, such as over the current month, past month, current, year, etc.

For example, the host system may calculate cumulative savings for all gaming devices or a group of gaming devices on a casino floor, such as showing the total cost savings for all gaming devices provided by a particular manufacturer for a period of time.

In some embodiments, in addition to disabling the GPU by the gaming device, other components may also be disabled or placed in a reduced power state, such as bill validators, lights, ticket printers, bonus devices, reels, amplifiers, etc. The gaming device can alter those devices into energy savings modes or alter their behaviors to save energy. For example, the EGM could dim the lights on a light controller or turn the volume down. In some embodiments, gaming device controller, including the main CPU or other processor circuit, may enter a low power mode such that the entire gaming device processor is in a low power state.

Embodiments described herein can be also be used to mitigate environments with unstable or limited power issues, such as a rolling blackout or building-wide power interruption. In these and other situations, battery backups, regulators, and/or generators could be used to supply a bank of gaming devices with power, with the gaming devices operating at a low power mode to conserve resources. For example, in response to a main power source being disconnected, each gaming device may be configured to automatically place unplayed gaming devices in low-power mode when using reserve power, reduce or scale the power profile of active gaming devices to conserve power, track the amount of remaining reserve power and the ability of the gaming devices to perform various energy-intensive functions, e.g., accept bills, print tickets, etc., and to provide notifications to players of limited time to cash out to avoid waiting for the system to recover in the event of complete power loss.

FIGS. 6 and 7 are flowcharts illustrating operations 600, 700 of systems/methods according to some embodiments. Referring now to FIG. 6, the operations 600 may include providing, by a processor circuit, a first graphical content to a display device of a gaming device via a first gaming device display interface coupled between a processor circuit and the display device (Block 602). The operations 600 may further include determining, by a processor circuit of the gaming device, whether a first trigger condition indicative of a power consumption reduction state for the gaming device has been satisfied (Block 604).

In response to determining that the first trigger condition has been satisfied, the operations 600 may further include providing second graphical content to the display device via a second gaming device display interface coupled between the processor circuit and the display device in parallel with the first gaming device display interface (Block 606). The operations 600 may further include discontinuing provision of the first graphical content to the display device via the first gaming device display interface (Block 608).

Referring now to FIG. 8, the operations 700 may include providing, by a processor circuit, a first graphical content to a first gaming device display interface of a gaming device via a second gaming device display interface coupled in series between the first gaming device display interface and the display device (Block 702). The operations 700 may further include determining, by a processor circuit of the gaming device, whether a first trigger condition indicative of a power consumption reduction state for the gaming device has been satisfied (Block 704).

In response to determining that the first trigger condition has been satisfied, the operations 700 may further include providing second graphical content to the display device via the second gaming device display interface (Block 706). The operations 700 may further include discontinuing provision of the first graphical content to the display device via the second gaming device display interface (Block 708).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A gaming device comprising:
a display device;
a processor circuit;
a first gaming device display interface coupled to the processor circuit;
a second gaming device display interface coupled in series between the first gaming device display interface and the display device; and
a memory coupled to the processor circuit, the memory comprising non-transitory machine-readable instructions that, when executed by the processor circuit, cause the processor circuit to:
provide first graphical content to the second gaming device display interface via the first gaming device display interface;
provide the first graphical content to the display device via the second gaming device display interface;
determine whether a first trigger condition indicative of a power consumption reduction state for the gaming device has been satisfied; and
in response to a determination that the first trigger condition has been satisfied:
provide second graphical content to the display device via the second gaming device display interface; and
discontinue provision of the first graphical content via the first gaming device display interface.

2. The gaming device of claim 1, further comprising a motherboard, wherein the processor circuit is coupled to the motherboard,
wherein the first gaming device display interface comprises a Graphical Processor Unit (GPU) coupled to the motherboard.

3. The gaming device of claim 1, further comprising:
a motherboard, wherein the processor circuit is coupled to the motherboard; and
a Slot Machine Interface Board (SMIB) connected to the motherboard in series between the first gaming device display interface and the display device, the SMIB comprising the second gaming device display interface.

4. The gaming device of claim 1, wherein the instructions that cause the processor circuit to provide second graphical content to the display device via the second gaming device display interface further cause the processor circuit to provide the second graphical content to the second gaming device display interface.

5. The gaming device of claim 1, wherein providing the second graphical content to display device causes the processor circuit to automatically discontinue providing the first graphical content to the first gaming device display interface.

6. The gaming device of claim 1, wherein discontinuing the provision of the first graphical content to the first gaming device display interface causes the processor circuit to automatically provide the second graphical content to the second gaming device display interface.

7. The gaming device of claim 1, wherein the instructions further cause the processor circuit to:
determine whether a second trigger condition indicative of a power consumption resumption state for the gaming device has been satisfied; and
in response to the determination that the second trigger condition has been satisfied:
resume provision of the first graphical content to the display device via the first gaming device display interface.

8. The gaming device of claim 7, wherein the instructions further cause the processor circuit to, in response to the determination that the second trigger condition has been satisfied:
discontinue provision of the second graphical content to the display device via the second gaming device display interface.

9. The gaming device of claim 1, wherein the first trigger condition comprises an activity level at the gaming device falling below a predetermined threshold.

10. The gaming device of claim 1, wherein the gaming device comprises a plurality of wagering games, and
wherein the first trigger condition comprises discontinuance of a first wagering game of the plurality of wagering games and initiation of a second wagering game of the plurality of wagering games.

11. The gaming device of claim 1, wherein the first trigger condition is based on a player status of a player of a wagering game at the gaming device.

12. The gaming device of claim 1, wherein the instructions further cause the processor circuit to, in response to the determination that the first trigger condition has been satisfied, provide third graphical content to the display device via the first gaming device display interface as a transition between providing the first graphical content and the second graphical content.

13. The gaming device of claim 1, wherein the instructions further cause the processor circuit to, in response to the determination that the first trigger condition has been satisfied:
simultaneously provide the first graphical content and the second graphical content to the display device for a predetermined transition period before discontinuing provision of the first graphical content via the first gaming device display interface.

14. A system comprising:
a processor circuit; and
a memory coupled to the processor circuit, the memory comprising non-transitory machine-readable instructions that, when executed by the processor circuit, cause the processor circuit to:

provide first graphical content via a first gaming device interface of the gaming device to a second gaming device display interface of the gaming device;

provide the first graphical content to a display device of the gaming device via the second gaming device display interface;

determine whether a first trigger condition indicative of a power consumption reduction state for the gaming device has been satisfied; and in response to a determination that the first trigger condition has been satisfied:

provide second graphical content to the display device via the second gaming device display interface; and discontinue provision of the first graphical content via the first gaming device display interface.

15. The system of claim 14, wherein the processor circuit is coupled to a motherboard of the gaming device, wherein the first gaming device display interface comprises a Graphical Processor Unit (GPU) coupled to the motherboard.

16. The system of claim 14, wherein the processor circuit and the first gaming device display interface are coupled to a motherboard of the gaming device, wherein the second gaming device display interface is integrated in a Slot Machine Interface Board (SMIB) connected to the motherboard in series between the first gaming device display interface and the display device.

17. The system of claim 14, wherein the instructions further cause the processor circuit to:

determine whether a second trigger condition indicative of a power consumption resumption state for the gaming device has been satisfied; and in response to the determination that the second trigger condition has been satisfied:

resume provision of the first graphical content to the display device via the first gaming device display interface and the second gaming device display interface; and discontinue provision of the second graphical content to the display device via the second gaming device display interface.

18. The system of claim 14, wherein the instructions further cause the processor circuit to, in response to the determination that the first trigger condition has been satisfied, provide third graphical content to the display device via the first gaming device display interface as a transition between providing the first graphical content and the second graphical content.

19. The system of claim 14, wherein the instructions further cause the processor circuit to, in response to the determination that the first trigger condition has been satisfied:

simultaneously provide the first graphical content and the second graphical content to the display device for a predetermined transition period before discontinuing provision of the first graphical content via the first gaming device display interface.

20. A method comprising:

providing, by a processor circuit, a first graphical content to a first gaming device display interface of a gaming device via a second gaming device display interface coupled in series between the first gaming device display interface and the display device;

determining, by a processor circuit of the gaming device, whether a first trigger condition indicative of a power consumption reduction state for the gaming device has been satisfied; and in response to determining that the first trigger condition has been satisfied:

providing second graphical content to the display device via the second gaming device display interface; and discontinuing provision of the first graphical content to the display device via the second gaming device display interface.

* * * * *